United States Patent
Wrench

[11] Patent Number: 5,275,068
[45] Date of Patent: Jan. 4, 1994

[54] HANDLE ASSEMBLY FOR RELIEVING WRIST JOINT STRESS

[76] Inventor: Robert A. Wrench, 7122 NE. 162nd St., Bothell, Wash. 98011-6300

[21] Appl. No.: 909,306

[22] Filed: Jul. 6, 1992

[51] Int. Cl.$^5$ .................... B26B 27/00; B62D 1/06
[52] U.S. Cl. ........................... 74/557; 30/298; 30/296.1
[58] Field of Search ............... 74/557, 528, 523, 524, 74/525; 30/298

[56] References Cited

U.S. PATENT DOCUMENTS

| | | | |
|---|---|---|---|
| 4,157,616 | 6/1979 | Lundquist | 30/298 |
| 4,593,466 | 6/1986 | O'Brien | 30/296.1 |
| 4,924,571 | 5/1990 | Albertson | 30/298 X |
| 4,924,924 | 5/1990 | Stewart | 30/298 X |
| 5,031,323 | 7/1991 | Honsa et al. | 30/298 X |
| 5,070,576 | 12/1991 | Banta | 30/296.1 X |

FOREIGN PATENT DOCUMENTS 916364 7/1954 Fed. Rep. of Germany ........ 30/298

*Primary Examiner*—Vinh T. Luong
*Attorney, Agent, or Firm*—Robert W. Jenny

[57] ABSTRACT

The handle assembly comprises a beam which extends from an area on the user's forearm to just beyond the user's knuckles between the phalanges and metatarsals. A saddle at the forearm end distributes loads over the forearm area. The saddle may be fitted with a adjustable strap to hold the saddle in place. There is a journal at the knuckle end, the axis of the journal being essentially parallel to the beam and positioned such that the hub of a hand grip attached to a shaft in the journal fits between the fore and middle fingers of the users hand. An adaptor is attached to the shaft to facilitate attaching any of a variety of tools or implements to the assembly. In one embodiment of the invention the grip comprises a second saddle which engages the wrist joint for the hand. Mounting the grip and adaptor on the journalled shaft enables altering the active direction of the tool or implement without moving the forearm saddle on the arm.

3 Claims, 2 Drawing Sheets

HANDLE ASSEMBLY FOR RELIEVING WRIST JOINT STRESS

BACKGROUND OF THE INVENTION 1. Field

The subject invention is in the field of handles for hand held and operated equipment, including, for examples, hammers, saws, typewriters and computer key boards. Specifically it is in the field of handles intended to relieve physical stress in the wrist joint during use of hand-held equipment. More specifically, it is in the field of handles for tools which must or may be used without action of the wrist joint of the hand holding the hand-held equipment. 2. Prior Art The patents listed below are a sampling of the prior art in this field, the closest prior art known to the inventor of the subject invention. U.S. Pat. Nos.:

| | |
|---|---|
| 2,353,557 | 4,570,340 |
| 2,672,685 | 4,924,571 |
| 4,117,593 | 4,924,924 |

The Arm Controlled Power Cutter of U.S. Pat. No. 4,924,571 and the Hand-held Turning Tool System of U.S. Pat. No. 4,924,924 both embody the principle feature of the subject invention: i.e. structure which bridges the wrist joint for the purpose of reducing the physical forces applied to and required of the joint relative to the bending moment applied by use of a particular tool or implement. This feature is not particularly applicable to tools or implements which require flexing of the wrist joint, such as a hammer or a tennis racquet but it is particularly applicable to tools and implements which do not necessarily require flexing of the wrist joint, such as knives and hand gardening tools.

The usefulness of a handle incorporating structure which bridges a wrist joint is significantly enhanced by having the handle readily and easily adaptable to use with a variety of tools and implements and to a variety of techniques of using any or all of the tools and implements. This is particularly true in view of the fact that a wrist joint has two primary rotary degrees of freedom with a complete range of combinations of the two.

Accordingly, the prime objective of the subject invention is to provide a handle having wrist bridging structure which significantly relieves physical stress on the user's wrist. A second objective is that the direction of action of a tool attached to the handle be controllable without movement of the apparatus on the user's forearm.

SUMMARY OF THE INVENTION

The subject invention is a handle assembly for various tools and implements, termed tools for the purposes of this disclosure. The handle comprises a beam, a saddle, a journal in the beam, a shaft, a grip and an adapter fitting. The beam extends from a point on a user's forearm near the elbow to just beyond the knuckles of the user's hand. The saddle is positioned at the beam end near the forearm and extends part way around the arm to distribute loads applied by the beam end to the arm. In some embodiments the saddle is fitted with a strap which encircles the arm to hold the beam end close to the arm when working loads tend to move the end away from the arm. The journal is positioned at the knuckle end of the beam and its axis is essentially parallel to the longitudinal axis of the beam. The shaft extends through the journal with the grip attached at one end so that it can be gripped in the user's hand. The tool holding adaptor is attached to the other end of the shaft and configured to hold whatever tool is being used with the handle. In some embodiments of the invention the handle is dedicated to a specific tool and no adaptor is needed, the tool being attached directly to or integral with the shaft. In other applications the adaptor may engage the handle of a pot or a second adaptor to hold a pot handle.

The use of the handle assembly is described with a knife blade, for example, attached to the adaptor. The adaptor is such that the blade can be attached with its cutting direction in a plane with the long dimension of the grip or in a plane perpendicular to the long dimension or at any desired angle. The handle assembly is used with the hand grasping the grip and the saddle in contact with the forearm. A preferred embodiment of the grip comprises an extension which contacts the user's wrist joint. The result of such contact is that cutting force on the knife is reacted by one force at the wrist joint and another at the saddle and the wrist joint carries no flexing forces. With a knife blade thus supported the cutting force is provided by the muscles at the back of the user's upper arm with no assistance by the muscles which control movement of the wrist joint. The use of the shaft in the journal allows rotation of the blade to adjust its cutting direction without rotating the saddle on the forearm.

The invention is described in more detail below with reference to the attached drawings.

DETAILED DESCRIPTION OF THE INVENTION

Figure 1:
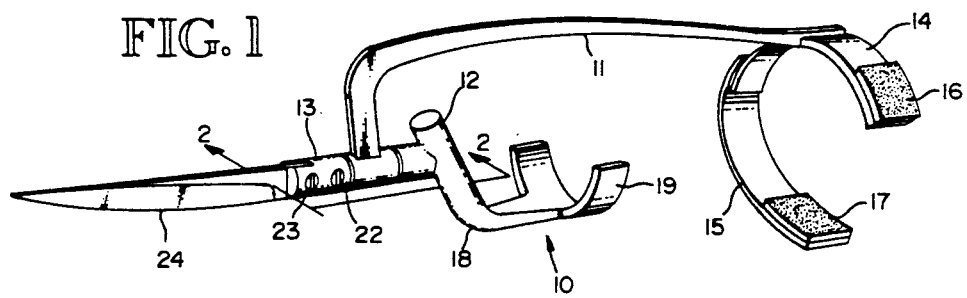
FIG. 1 is a perspective view of the subject handle assembly with a knife blade attached.
Figure 2:
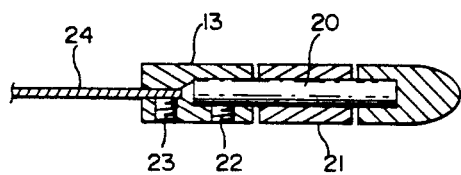
FIG. 2 is a section taken at 2—2 in FIG. 1.

The subject invention is a handle assembly for use with hand operated tools, such as knives, handsaws and garden tools which, in their use, do not ordinarily involve wrist joint motion and the muscles, tendons etc. which control that motion, but, instead, require that the wrist joint be held essentially immobile. A specific embodiment of the invention is shown in FIG. 1. Assembly 10 comprises a beam 11, a grip 12, an adaptor 13, an arm saddle 14, a strap 15, Velcro TM hook and loop fastener components 16 and 17 and a grip extension 18. Wrist joint saddle 19 is part of extension 18. Saddle 19 contacts the user's wrist. The saddles may be padded or appropriate pads may be fastened independently on the user's wrist joint and fore arm. The grip and adaptor are mounted on a shaft 20, shown in FIG. 2, a section taken at 2—2 in FIG. 1. The shaft is carried in journal 21 of the beam. Set screw 22 clamps the adaptor to the shaft and set screw 23 holds knife blade 24 in place in the tool holding adaptor.

Figure 3:
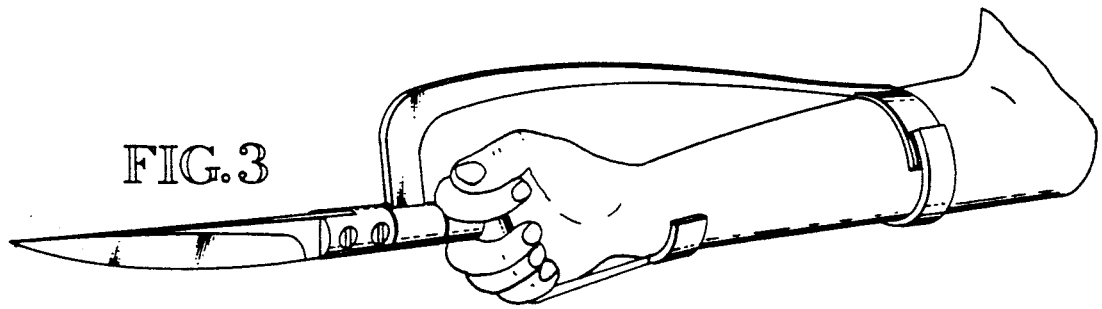
FIG. 3 illustrates the handle assembly held on an arm and hand.

FIG. 3 illustrates the apparatus in place on a user's hand and arm.

Figure 4:
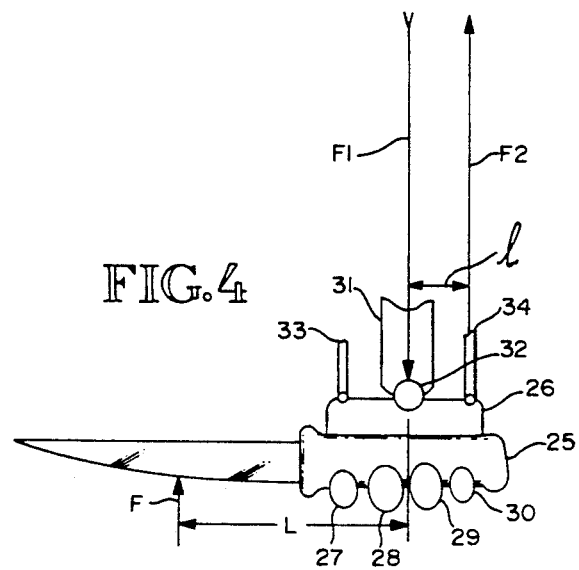
FIG. 4 is a force diagram of a hand using a knife blade.
Figure 5:
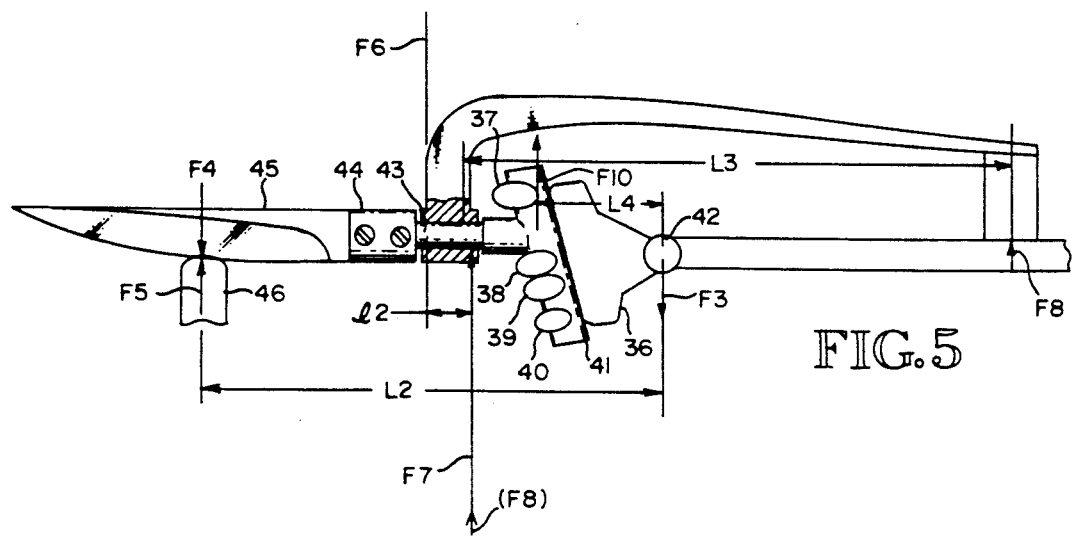
FIG. 5 is a force diagram of the handle assembly used with a knife blade.
Figure 6:
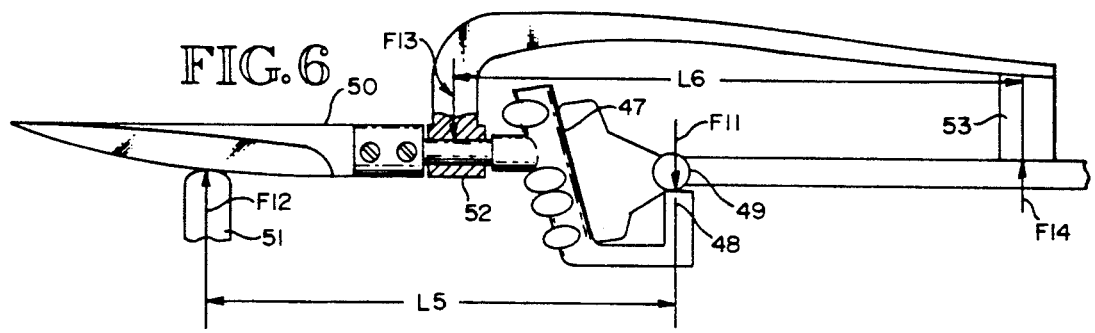
FIG. 6 is a force diagram of the handle assembly having a wrist saddle and used with a knife blade.

FIGS. 4, 5 and 6 are force diagrams which illustrate how the subject invention achieves its primary objective of relieving physical stress of the wrist joint. In each diagram the lengths of the force arrows indicate the relative magnitudes of the forces represented. FIG. 4 illustrates the forces involved with a hand using a knife. Knife 25 is held in schematic hand 26 with schematic fingers 27, 28, 29 and 30. The hand is connected to forearm 31 by wrist joint 32. Tendons 33 and 34 are used to hold the hand relatively immobile with respect to the arm. Force F on knife blade 35 is reacted by force F1 at the joint and F2 applied by tendon 34. Forces F and F1 comprise one force couple with a lever arm of L. This couple is opposed by the couple comprising forces F1 and F2 having a lever arm of 1. Force F2 is L/1 times force F and force F1 is the sum of forces F and F2. Accordingly the physical forces in the wrist are several times the force applied at the knife blade.

FIG. 5 is a schematic force diagram of the subject apparatus with a knife blade attached, showing schematic hand 36 with fingers 37, 38, 39 and 40 gripping grip 41. Force F3 is applied at wrist joint 42 and transferred through grip 41, shaft 43 and adaptor 44 to knife blade 45 which applies force F4 to material 46. Reaction force F5 from the material and force F3 generate a force couple with an arm L2. This couple is resisted by a couple comprising forces F6 and F7 in the journal with an arm l2. Forces F6 and F7 are L2/l2 times greater than forces F3 and F5. The force couple in the journal is in turn reacted by a moment provided by force F8 with an arm of L3. Force F8 is only l2/L3 of Force F7 and is additive to F7.

Figure 5A:
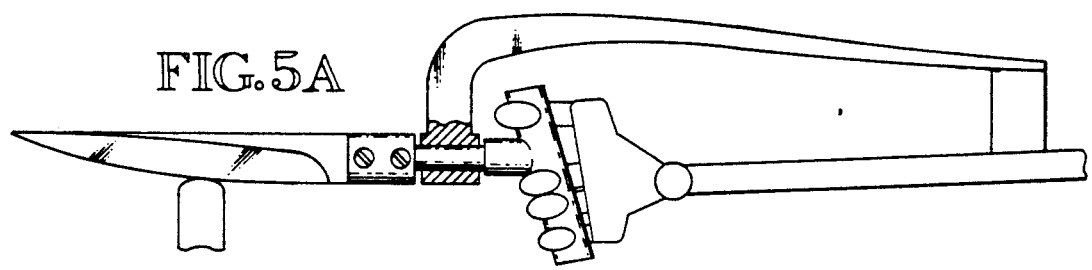
FIG. 5A shows the assembly of FIG. 5 with the user's grip loosened.

The transmission of force F3 to the grip involves a couple comprising forces F3 and F10 with an arm L4. This couple is reacted by forces applied by the fingers and palm of the schematic hand. The finger and hand forces are essentially equal to force F3 because of the geometry of human hands. FIG. 5A schematically illustrates what happens if the gripping forces are insufficient. The gripping forces are supplied by tendons which pass through the carpal tunnel in the human wrist joint.

FIG. 6 is a schematic force diagram of the subject invention in which grip 47 comprises a wrist saddle 48. Force F11 is applied to the saddle by wrist 49 and transferred to knife blade 50, generating reaction force F12 from work material 51. Forces F11 and F12 are a force couple with arm L5. That couple is reacted by a couple comprising force F13 at the journal 52 and force F14 at the forearm saddle 53, with an arm of L6. Since L5 and L6 are essentially equal, all the forces involved are essentially equal. The wrist joint and related tendons are not involved in applying and controlling cutting forces on the knife blade. Accordingly the subject invention clearly meets its primary objective in this embodiment. The rotability of the grip and knife blade allow control of the cutting direction of the blade without rotating the apparatus on the forearm and accordingly the invention meets its second objective.

It is considered to be understood that while certain embodiments of the invention are disclosed herein, other embodiments and modifications of those disclosed are possible within the scope of the invention which is limited only by the attached claims.

I claim:

1. A handle assembly adapted for holding and use by a user for holding and using a tool, said assembly comprising:

a beam having first and second ends and a saddle at said first end and a journal at said second end, said beam having a first longitudinal axis, said journal having a second longitudinal axis, said first and second axes being essentially parallel, said saddle being shaped and positioned to engage the forearm of said user, a shaft having first and second shaft ends, a grip and a tool holding adaptor, said shaft having first and second shaft ends and being installed in said journal with said first and second shaft ends extending beyond said journal, said grip being attached to said first shaft end, said adaptor being attached to said second shaft end, whereby with said tool held in said adaptor, said grip held in a hand of said user and said saddle engaging said forearm of said user, said handle assembly enable use of said tool.

2. The handle assembly of claim 1 in which said grip further comprises a wrist joint saddle.

3. A handle assembly for holding and use by a user for holding and using a tool, said assembly comprising:

a beam having first and second ends, a saddle, a tool holding adaptor, a grip and means for attaching said tool to said adaptor, said saddle being attached to said first end of said beam, said grip and means for attaching being attached to said second end of said beam, said grip extending toward said first end and said adaptor extending away from said first end, said grip further comprising a wrist saddle.

* * * * *